United States Patent

Tsujimoto et al.

[19]

[11] Patent Number: 5,887,178

[45] Date of Patent: Mar. 23, 1999

[54] IDLE STATE DETECTOR AND IDLE STATE DETECTING METHOD FOR A MICROPROCESSOR UNIT FOR POWER SAVINGS

[75] Inventors: Taizou Tsujimoto; Shinji Ozaki; Akihiko Ohtani; Toshio Sugimura, all of Osaka, Japan

[73] Assignee: Matsushita Electronics Corporation, Osaka, Japan

[21] Appl. No.: 519,745

[22] Filed: Aug. 28, 1995

[30] Foreign Application Priority Data

Aug. 29, 1994 [JP] Japan .................................. 6-203225

[51] Int. Cl.[6] ........................................................ G06F 1/32
[52] U.S. Cl. ................................ 395/750.05; 395/183.15; 395/185.01; 395/557; 395/750.04
[58] Field of Search ......................... 395/183.15, 185.04, 395/550, 750, 775, 105.01, 557, 750.05, 750.04

[56] References Cited

U.S. PATENT DOCUMENTS

| | | | |
|---|---|---|---|
| 4,879,647 | 11/1989 | Yazawa | 395/375 |
| 5,278,976 | 1/1994 | Wu | 395/185.08 |
| 5,475,847 | 12/1995 | Ikeda | 395/750 |
| 5,475,848 | 12/1995 | Ikeda | 395/750 |
| 5,560,017 | 9/1996 | Barrett et al. | 395/733 |

OTHER PUBLICATIONS

Nikkei Electronics, Jul. 5, 1993 (No. 585) pp. 172–178 and English Abstract.

*Primary Examiner*—Kenneth S. Kim
*Attorney, Agent, or Firm*—McDermott, Will & Emery

[57] ABSTRACT

An instruction address that is referred to by a microprocessor unit is inputted over an instruction address bus and is stored. While counting the number of times a clock is fed to the microprocessor unit, a comparison is made between the stored instruction address and an instruction address that the microprocessor provides onto the instruction address bus. A clock count value, obtained at the time when the aforesaid instruction addresses agree, is stored. If a stored instruction address and an instruction address on the instruction address bus agree for every stored clock count value, then the microprocessor is judged to repeatedly execute a sequence of instructions and the loop count value is incremented by one. When the loop count value exceeds a predetermined value, the microprocessor is judged to be placed in an idle state and the clock frequency is lowered.

28 Claims, 10 Drawing Sheets

IDLE STATE DETECTOR AND IDLE STATE DETECTING METHOD FOR A MICROPROCESSOR UNIT FOR POWER SAVINGS

BACKGROUND OF THE INVENTION

This invention pertains to a detector capable of detecting the existence of an idle state of the microprocessor unit (MPU) for power saving.

Recently various, portable-type communication devices have been commercialized. Such a portable-type communication device is usually battery-driven and therefore lower power dissipation achieves longer battery life and continuous use.

Although reduction in the clock frequency (i.e., the operating frequency of the MPU) produces the advantage that a less amount of power is dissipated, such results in the performance loss. Therefore, low-power communication devices may not be obtained by simply reducing their operating frequency.

Observing a way of how the user actually operates a communication device shows that the MPU is frequently placed in the key-entry wait state or in the mouse-entry wait state. In such a wait state, the MPU just waits for a command to come from the outside, in other words the MPU is in the idle state.

FIG. 9 is a flow diagram showing a sequence of operations of an MPU which is placed in the idle state, more specifically, in a key-entry wait state.

At STEP S1, INSTRUCTION A is read from at ADDRESS #a. At STEP S2, data held by a keyboard input interface is transferred to a register according to INSTRUCTION A. At STEP S3, INSTRUCTION B is read from at ADDRESS #b. At STEP S4, the data of the register is checked as to whether it indicates the presence of a key entry. If STEP S4 says YES, then a process of accepting a following key entry is executed. On the other hand, if STEP S4 says NO, the program returns to STEP S1. In other words, the MPU repeatedly executes a series of steps, namely STEP S1 through STEP S4, until a new key entry is inputted.

As can be seen from FIG. 9, a drop in the operating frequency may not make the operator feel inconvenience. Therefore, the power consumption of communication devices can be reduced by lowering the operating frequency when the MPU is detected to be in the idle state.

FIG. 10 is a conceptual diagram useful in understanding the organization of a prior art idle state detector. 61 is a storage space for use by the MPU. Storage space 61 corresponds to a memory area for storing a program for use in executing operations, to a key entry interface, and to the like element. 62 is a detection element. Each detection element 62 is assigned a respective memory space and sets a flag when an address indicative of the assigned memory space is referred to by the MPU. Storage space 61 is a 1M-word storage space, and a single detection element 62 is provided for every 2K words. Therefore, the number of detection elements 62 is 512.

When the MPU is placed in an idle state and operates according to the flow diagram of FIG. 9, referred-to addresses by the MPU are only those, i.e., ADDRESS #a, ADDRESS #b, and ADDRESS of the key entry interface. At this point in time, only detection elements 62, indicated in FIG. 10 by circles with oblique lines, set respective flags.

NIKKEI ELECTRONICS (No. 585, pp. 171–178, 5 Jul. 1993) reports a technique. In accordance with this technique, flag status information of detection element 62 as to an MPU idle state is prestored in an idle state detecting circuit. The idle state detecting circuit is able to detect the existence of an MPU idle state by watching the flag status of detection element 62.

The prior art idle state detector, however, suffers the following problems. In a conventional idle state detector, a memory space assigned to a single detection element 62 has a specific memory space size, so that it is most likely that the state of the MPU is detected wrongly, in other words, even when the MPU repeatedly performs usual arithmetic operations in a non-idle state, the MPU is misjudged to be in an idle state.

Larger number of detection elements 62 achieves better results of the idle state detection. Theoretically, it is possible to detect an MPU idle state at 100% accuracy if one detection element 62 is provided for every memory space address. This, however, increases the amount of hardware. As a result, more device area is required and more power is consumed. To sum up, in the prior art idle state detector the accuracy of detecting the existence of an idle state and the amount of hardware are in a tradeoff relationship.

SUMMARY OF THE INVENTION

Bearing in mind the above-descried problems with the prior art techniques, the present invention was made. This invention discloses an idle state detector having an improved structure. A general object of this invention is to provide an improved, down-sized idle state detector capable of detecting, at a higher accuracy, the existence of an MPU idle state.

More specifically, an instruction address that is referred to by a processor and a clock for use by the processor are inputted. Judgment is made as to whether the processor repeatedly makes a reference to a particular instruction address at time intervals of a fixed number of clocks. When the processor is judged to repeatedly refer to the instruction address, the number of times the processor makes such a reference is counted. When the result exceeds a fixed value, the processor is judged to be placed in an idle state in which the processor repeatedly executes a sequence of instructions until a command is inputted from the outside.

Accordingly the accuracy of detecting an MPU idle state becomes irrelevant to the amount of hardware. An idle state detector can be implemented with a less amount of circuitry, regardless of the size of memory space.

An idle state detector of this invention may include an idle state register capable of storing information to specify an idle state. Judgment is made as to whether the processor is placed in a loop execution state in which the processor repeatedly executes a sequence of instructions. When the processor is judged to be placed in a loop execution state, a judgement is made as to whether information specifying such a loop execution state and information specifying an MPU idle state stored in the idle state register agree. If they agree then the processor is judged to be placed in the idle state.

Accordingly such arrangement not only prevents false detection of the state of the processor but also increasingly improves the idle state detection accuracy.

DETAILED DESCRIPTION OF THE INVENTION

Preferred embodiments of this invention are now described below with reference to the accompanying drawing figures.

Embodiment 1

Figure 1:
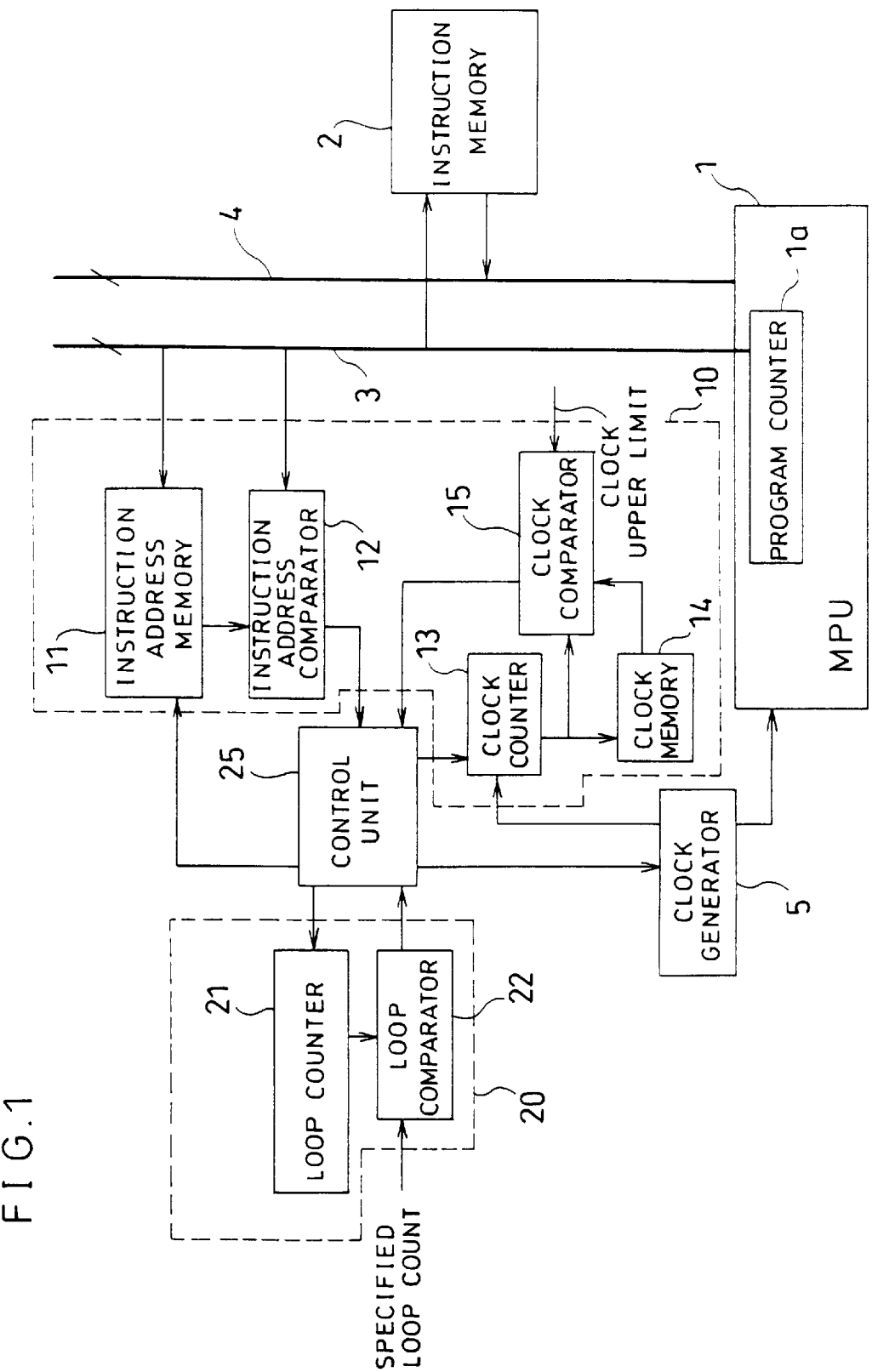
FIG. 1 is a block diagram of a first idle state detector in accordance with the present invention.

FIG. 1 depicts in block form an idle state detector of the first embodiment. 1 is a microprocessor unit (MPU) which has a program counter 1a. 2 is an instruction memory. 3 is an instruction address bus. 4 is an instruction bus. MPU 1, instruction memory 2, instruction address bus 3, and instruction bus 4 are ones that are usually employed in a conventional communication device. When MPU 1 runs a program, program counter 1a provides an instruction address to instruction memory 2 over instruction address bus 3. An instruction, stored at a location of instruction memory 2 specified by the aforesaid instruction address, is transferred over instruction bus 4 to MPU 1. 5 is a clock generator. Clock generator 5 generates a clock signal to MPU 1.

The present idle state detector is composed of first means 10, second means 20, and control unit 25. First means 10 is made up of instruction address memory 11, instruction address comparator 12, clock counter 13, clock memory 14, and clock comparator 15. Second means 20 is made up of loop counter 21 and loop comparator 22.

Under the control of control unit 25, instruction address memory 11 stores an instruction address received from MPU 1 via instruction address bus 3. Instruction address comparator 12 makes a comparison between an instruction address stored by instruction address memory 11 and an instruction address transferred over instruction address bus 3. Under the control of control unit 25, clock counter 13 counts the number of times clock generator 5 supplies a clock to MPU 1. Clock memory 14 stores a count value, i.e., a result of the counting operation performed by clock counter 13. Clock comparator 15 compares a count value found by clock counter 13 with a count value stored in clock memory 14 and the compare result is forwarded to control unit 25. Clock comparator 15 further makes a comparison between a count value found by clock counter 13 and an inputted clock upper-limit and the compare result is forwarded to control unit 25.

Loop counter 21 performs a counting operation under the control of control unit 25. Loop comparator 22 compares a count value found by loop counter 21 with a predetermined value, and the compare result is forwarded to control unit 25.

Control unit 25 controls first means 10 and second means 20 and, based on the compare result received from loop comparator 22, makes a judgement of whether MPU 1 is placed in the idle state. According to the judgment, control unit 25 controls the frequency of the clock generated by clock generator 5.

The operation of the above-described idle state detector is illustrated below.

Figure 9:
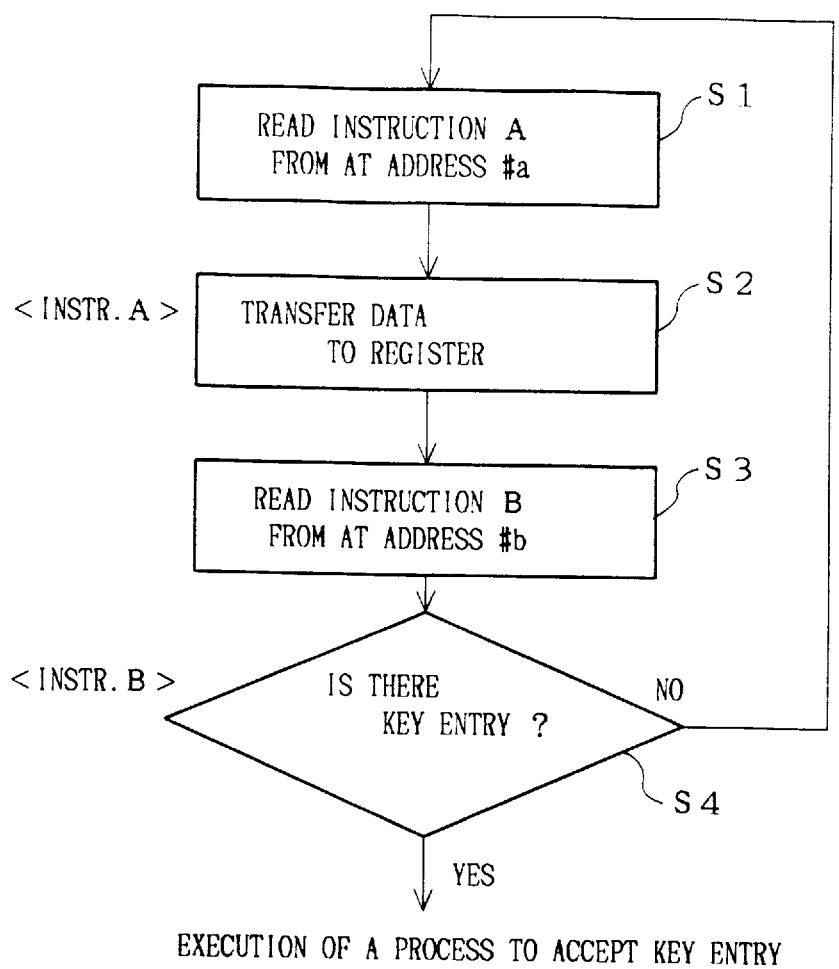
FIG. 9 is a diagram illustrating a sequence of operations of an MPU in an idle state.
Figure 10:
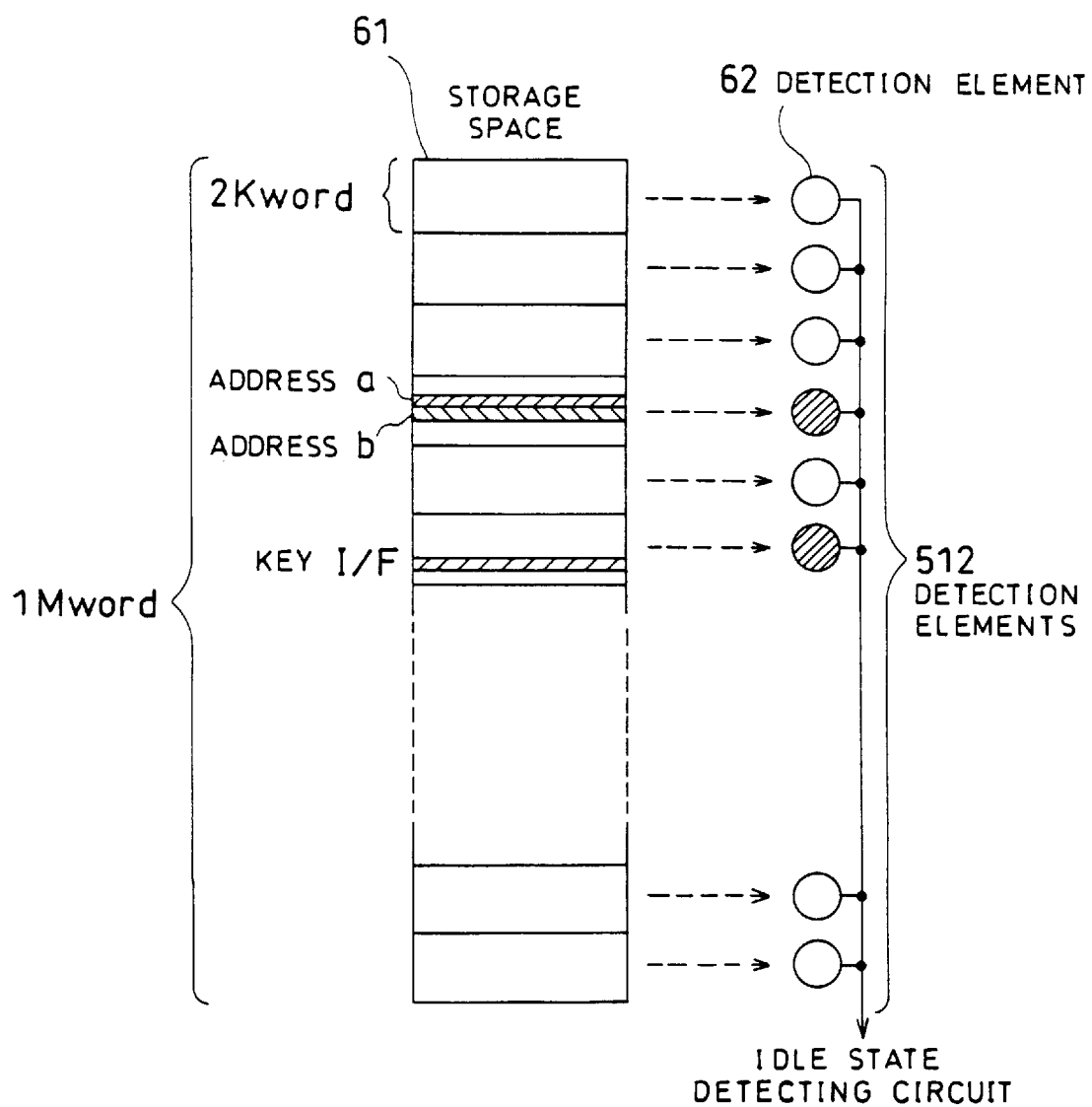
FIG. 10 is a conceptual diagram illustrating the organization of a prior art idle state detector.

Once MPU 1 enters the idle state, MPU 1 repeatedly executes a sequence of instructions. For example, each of INSTRUCTION A and INSTRUCTION B is executed for every four steps (see FIG. 9). In such a case, the instruction address of each of INSTRUCTIONS A, B is referred to and transferred to instruction address bus 3, at time intervals corresponding to the number of clocks taken to execute a 4-step instruction. By detecting such an event, the present idle state detector becomes able to detect the existence of an MPU's 1 idle state.

Figure 2:
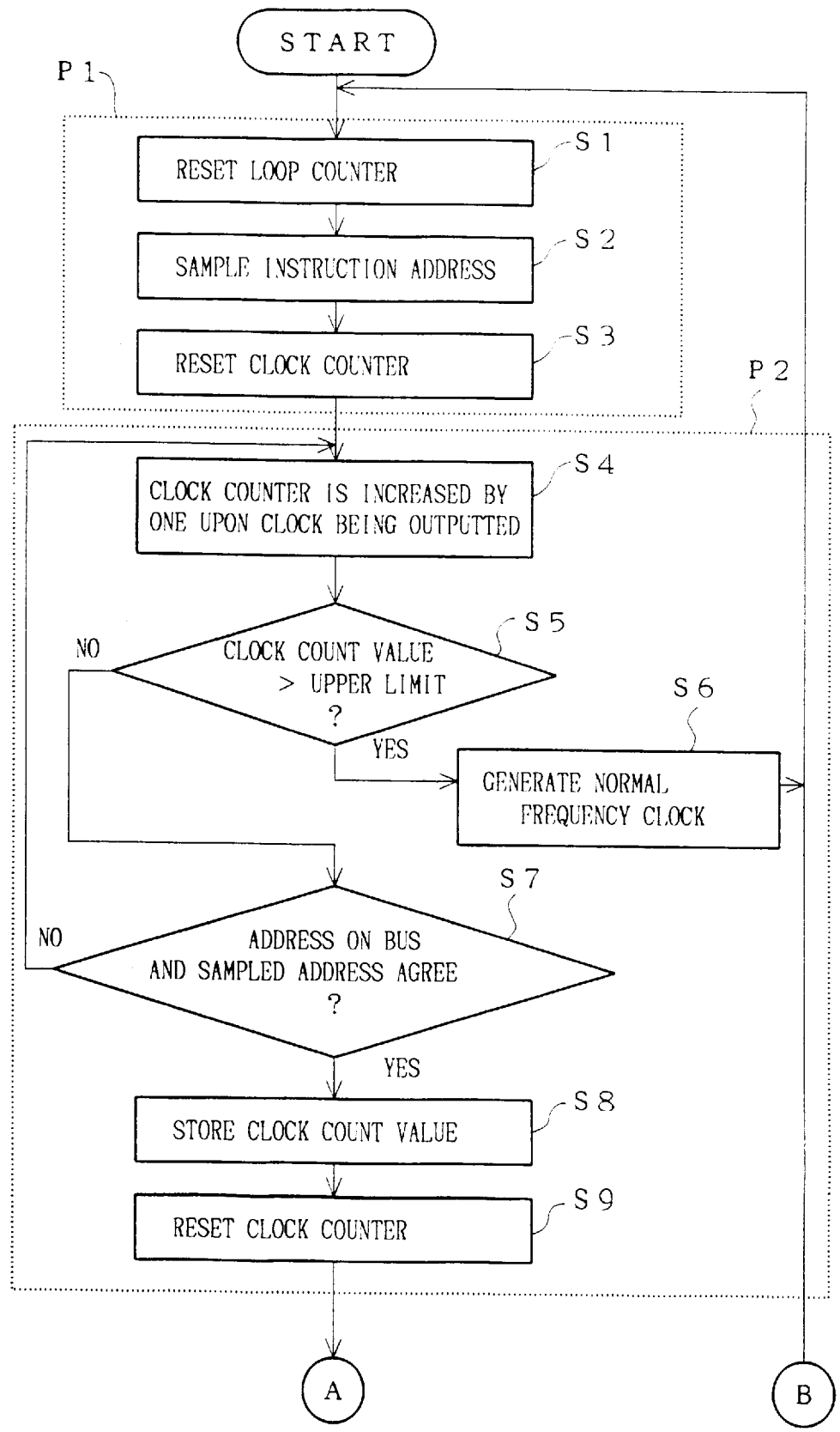
FIGS. 2 through FIG. 3 are diagrams illustrating a sequence of operations of the first idle state detector.
Figure 3:
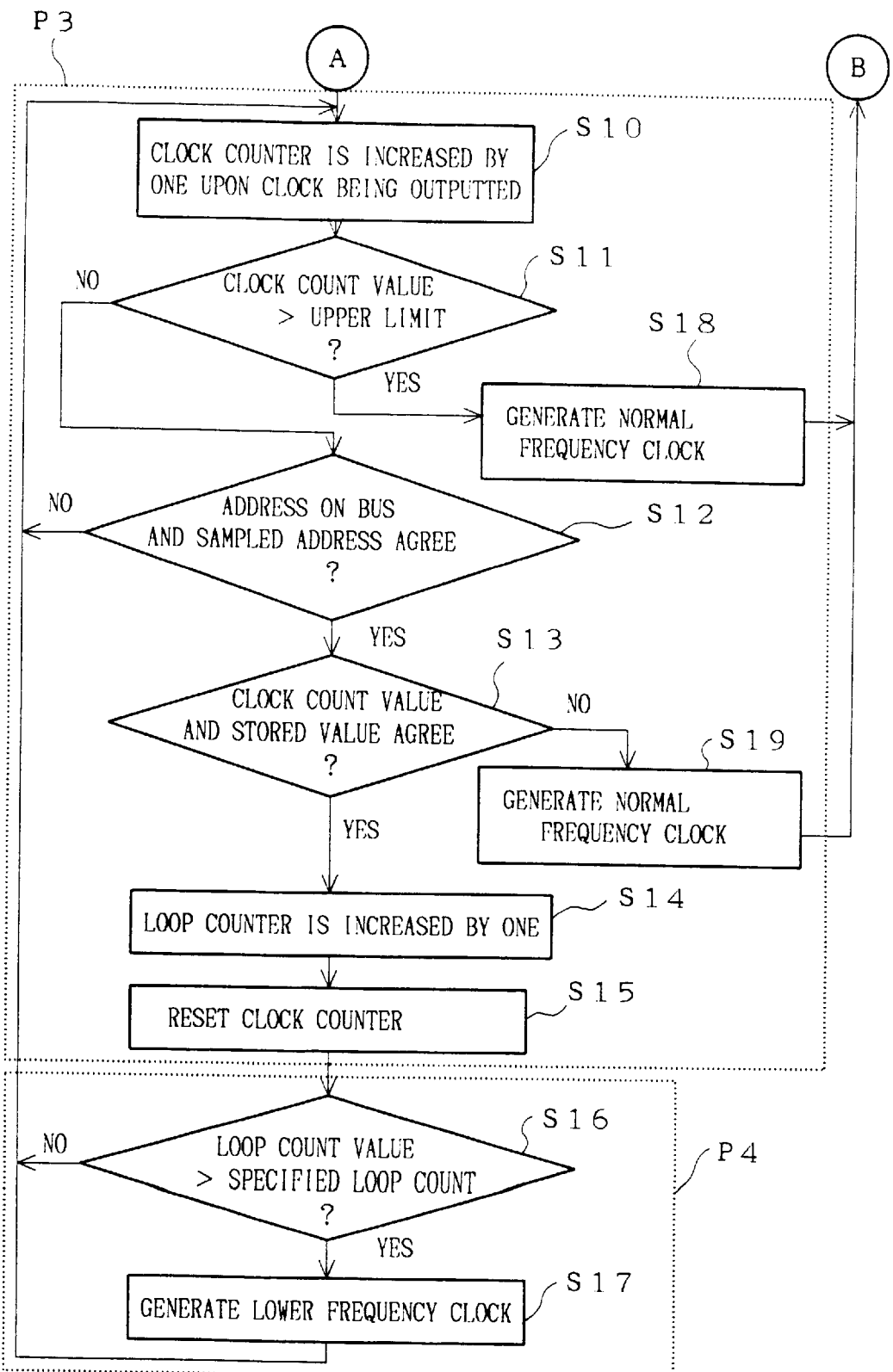

FIGS. 2 through FIG. 3 are diagrams illustrating a first example of the operation of the present idle state detector.

In PROCEDURE P1, an instruction address that is referred to by MPU 1 is subjected to a sampling process. In PROCEDURE P2, a judgment of whether the sampled instruction address is referred to again by MPU 1 within a specific period of time is made, to determine whether MPU 1 performs a loop operation. The period is determined according to the number of clocks fed to MPU 1. In PROCEDURE P3, a judgment of whether the loop operation detected in PROCEDURE P2 is performed again by MPU 1. In PROCEDURE P4, a judgement of whether the number of times such a re-detected loop operation is detected amounts to a specified value. If PROCEDURE P4 says YES, then MPU 1 is judged to be in the idle state.

The above-described PROCEDURES P1–P4 are described in detail. PROCEDURE P1, comprised of STEPS S1–S3, is explained first. At STEP S1, loop counter 21 is reset to zero. At STEP S2, instruction address memory 11 stores an instruction address transferred over instruction address bus 3. At STEP S3, clock counter 13 is reset to zero and the program proceeds to PROCEDURE P2 comprised of STEPS S4–S9.

PROCEDURE P2 is described. At STEP S4, clock counter 13 is incremented by one each time clock generator 5 provides a clock. At this point in time, MPU 1 provides onto instruction address bus 3 an instruction address at which an instruction to be executed next is stored. Next, at STEP S5, clock comparator 15 compares a count value of clock counter 13 with the clock upper limit. If the former value exceeds the latter value, then MPU 1 is judged not to be in the idle state, and the program proceeds to STEP S6. At STEP S6, clock generator 5 is controlled in such a way as to generate a normal frequency clock and the program is brought back to STEP S1 of PROCEDURE P1. On the other hand, if the former value is found to be below the latter value then the program proceeds to STEP S7.

At STEP S7, instruction address comparator 12 makes a comparison between an instruction address stored by instruction memory 11 and an instruction address on instruction address bus 3. If these instruction addresses agree, then the program proceeds to STEP S8. If they disagree, then the program returns to STEP S4. At STEP S8, clock memory 14 stores a count value of clock counter 13. At STEP S9, clock counter 13 is reset to zero. The program proceeds to PROCEDURE P3 comprised of STEPS S10–S15.

PROCEDURE P3 is described. At STEP S10, clock counter 13 is increased by one each time clock generator 5 provides a clock. At this point in time, MPU 1 provides onto instruction address bus 3 an instruction address at which an instruction to be executed next is stored.

At STEP S11, clock comparator 15 makes a comparison between a count value of clock counter 13 and the clock upper limit. If the former value exceeds the latter value, then MPU 1 is judged not to be in the idle state, and the program proceeds to STEP S18. At STEP S18, clock generator 5 is controlled in such a way as to generate a normal frequency clock. Then, the program returns to STEP S1 of PROCEDURE P1. If the former value is found to be below the latter value, the program proceeds to STEP S12.

At STEP S12, instruction address comparator 12 compares an instruction address stored by instruction address memory 11 and an instruction address on instruction address bus 3. If these instruction addresses agree, then the program proceeds to STEP S13. If they disagree, then the program returns to STEP S10.

At STEP S13, clock comparator 15 makes a comparison between a count value of clock counter 13 and a value stored by clock memory 14. If these two values disagree, then MPU 1 is judged not to be in the idle state. The program then proceeds to STEP S19. At STEP S19, clock generator 5 is controlled in such a way as to generate a normal frequency clock, and the program returns to STEP S1 of PROCEDURE P1. Conversely, if they agree, then the program proceeds to STEP S14.

At STEP S14, loop counter 21 is increased by one. Next, at STEP S15, clock counter 13 is reset to zero and the program proceeds to PROCEDURE P4 of STEPS S16–S17.

Last of all, PROCEDURE P4 is illustrated. At STEP S1, loop comparator 22 makes a comparison between a count value of loop counter 21 and the specified loop count. If the former value is found to be below the specified loop count, then the program returns to STEP S10 of PROCEDURE P3. Conversely, if the former value exceeds the specified loop count, then MPU 1 is judged to be in the idle state. The program then proceeds to STEP S17. At STEP S17, clock generator 5 is controlled in such a way as to generate a lower frequency clock as compared with the normal frequency clock and the program returns to STEP S10 of PROCEDURE P3.

The value of the clock upper-limit and the value of the specified loop count are specified as follows. In the previously mentioned report, NIKKEI ELECTRONICS, a final program loop cycle of below about 1 ms is used, assuming that the cycle of program loops at the time that the MPU is in an idle state waiting for a key entry from the keyboard is estimated several milliseconds or less. From this, a clock upper limit of about 33,000 is used, when the clock frequency of the MPU is 33 MHz.

While the specified loop count may take a value of zero, the possibility that non-idle state program loops are wrongly detected can be reduced if a specified loop count having a greater value is used. However, the setting of a greater loop count presents the problem that it takes a long time to detect an MPU idle state, and even if an MPU is in the idle state there is made no transition to a lower frequency clock until a program loop is repeated a specified number of times. For example, if the specified loop count=1,000, it takes 100 ms if the cycle of the program loop is 100 μs. In the event of a key entry wait state, it takes more than 100 ms. This setting will not sufficiently reduce the power consumption.

Figure 4:
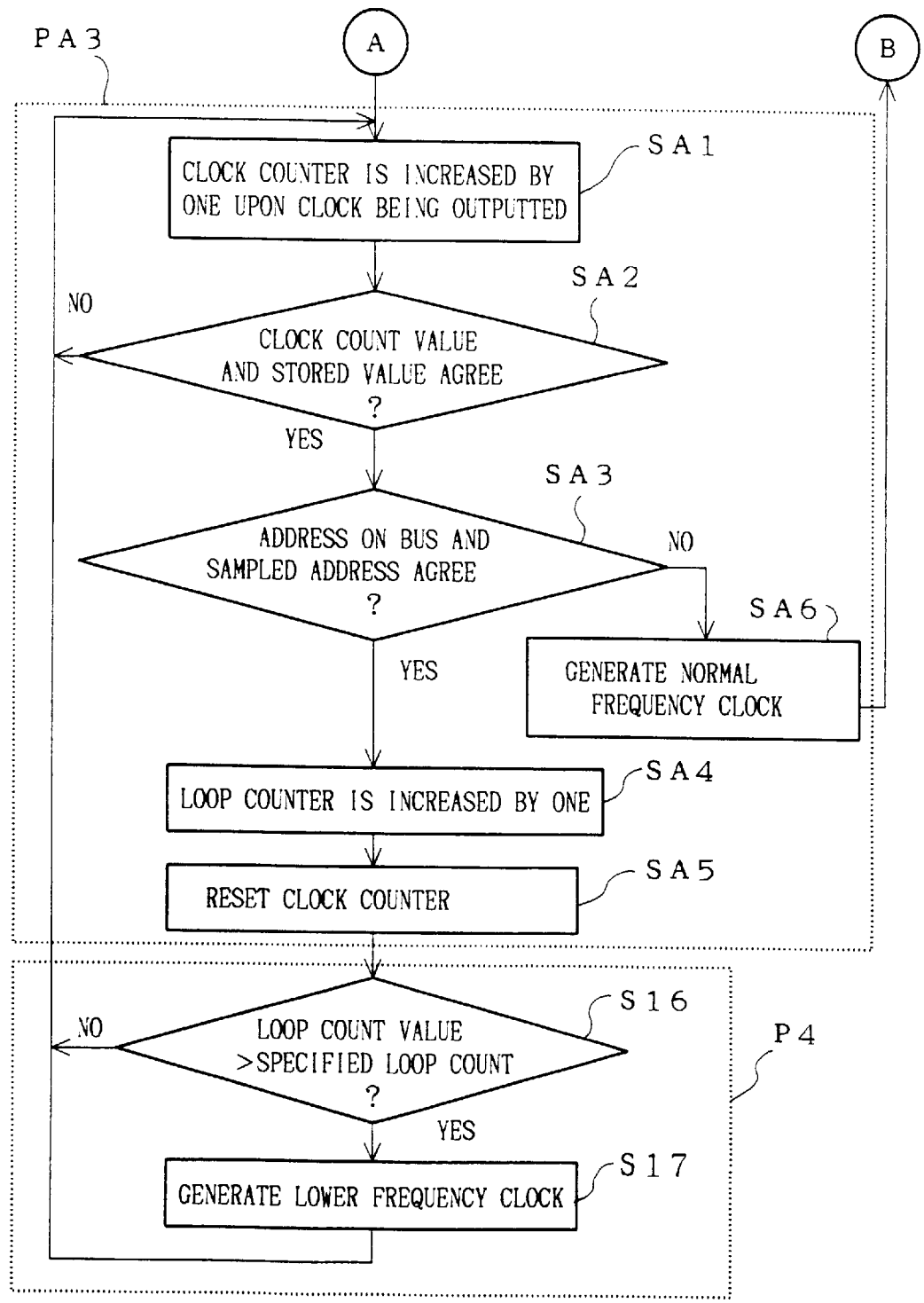
FIG. 4 is a diagram illustrating another sequence of operations of the first idle state detector.

FIG. 4 is a diagram illustrating a second example of the operation of the present idle state detector. This operation example and the foregoing first operation example are roughly identical with each other except for the details of the third procedure. The omission of PROCEDURES P1, P2 is made in FIG. 4.

PROCEDURE PA3 is explained. At STEP SA1, clock counter 13 is incremented by one each time clock generator 5 provides a clock to MPU 1. At this point in time, MPU 1 provides onto instruction address bus 3 an instruction address at which an instruction to be executed next is stored.

At STEP SA2, clock comparator 15 makes a comparison between a count value of clock counter 13 and a value stored by clock memory 14. If they agree, then the program proceeds to STEP SA3. If they disagree, then the program returns to STEP SA1.

At STEP SA3, an instruction address stored in instruction address memory 11 is compared with an instruction address on instruction address bus 3 by means of instruction address comparator 12. If they disagree, then MPU 1 is judged not to be in the idle state. The program then proceeds to STEP SA6. At STEP SA6, clock generator 5 is controlled in such way as to supply a normal frequency clock and the program returns to STEP S1 of PROCEDURE P1 of FIG. 2. If they agree, then the program proceeds to STEP SA4.

At STEP SA4, loop counter 21 is increased by one. Next, at STEP SA5, clock counter 13 is reset to zero and the program then proceeds to STEP S16.

PROCEDURE P4 of the second operation example is identical with its counterpart of the first operation example. At STEP S16, loop comparator 22 makes a comparison between a count value of loop counter 21 and the specified loop count. If the former value is found to be below the latter value, then the program returns to STEP SA1. Conversely, if the former value is found to be above the latter value, then MPU 1 is judged to be in the idle state. The program then proceeds to STEP S17. At STEP S17, clock generator 5 is controlled in such a way as to generate a lower frequency clock as compared with the normal frequency clock and the program returns to STEP SA1.

Figure 5:
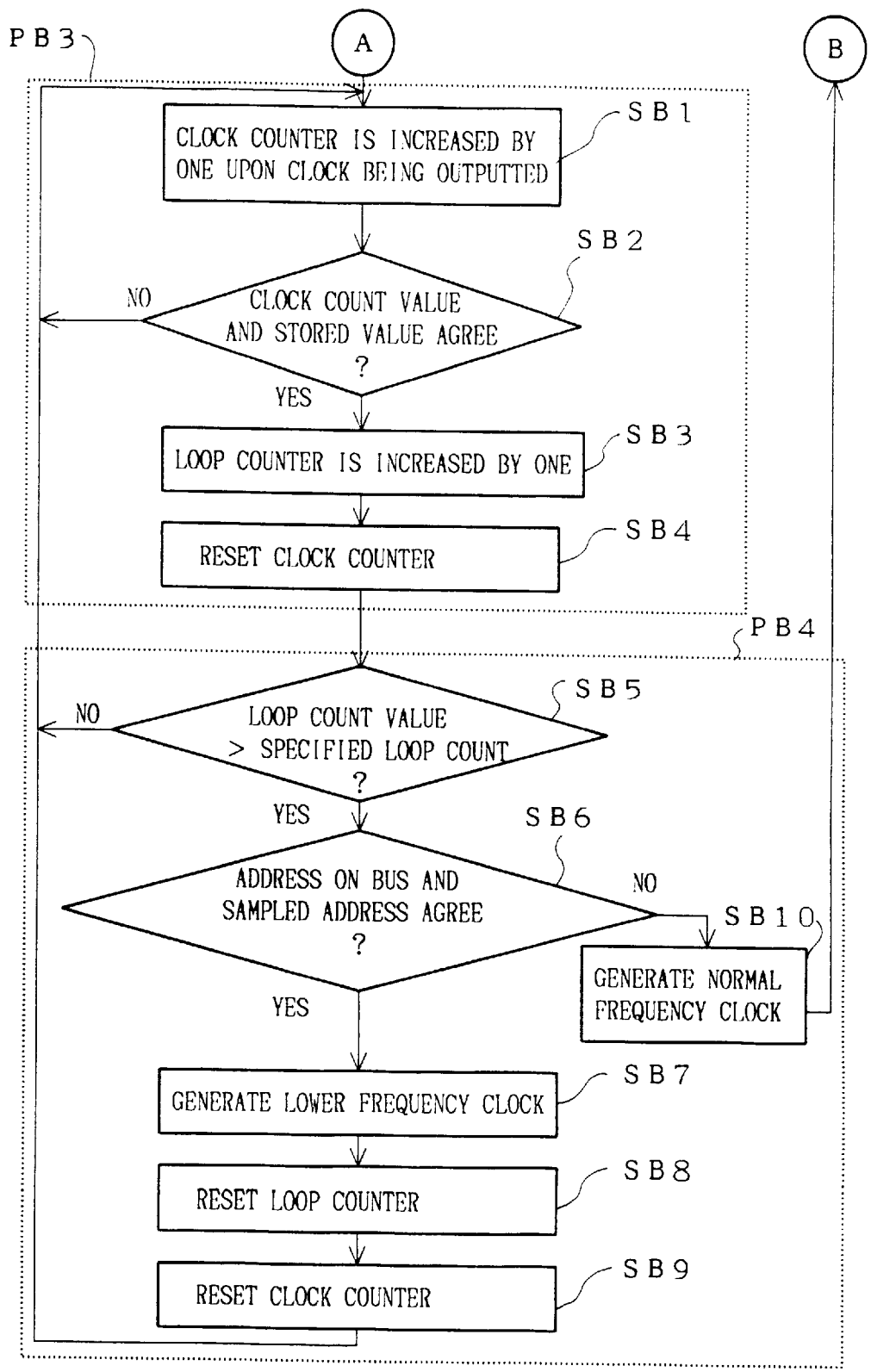
FIG. 5 is a diagram illustrating still another sequence of operations of the first idle state detector.

FIG. 5 is a diagram showing a third example of the operation of the present idle state detector. The present operation example is identical with the foregoing first and second operation examples except for the third and fourth procedures. The omission of the first and second procedures is made in FIG. 5, and only the third and fourth procedures, PROCEDURES PB3 and PB4, are illustrated with reference to FIG. 5.

PROCEDURE PB3 comprised of STEPS SB1–SB4 is explained. At STEP SB1, clock counter 13 is incremented by one each time clock generator 5 provides a clock to MPU 1. At this point in time, MPU 1 provides onto instruction address bus 3 an instruction address at which an instruction to be executed next is stored.

At STEP SB2, a count value of clock counter 13 is compared with a value stored by clock memory 14 by means of clock comparator 15. If they agree, then the program proceeds to STEP SB3. If they disagree, then the program returns to STEP SB1.

At STEP SB3, loop counter 21 is increased by one. Next, at STEP SB4, clock counter 13 is reset to zero and the program then proceeds to PROCEDURE PB4 comprised of STEPS SB5–SB9.

PROCEDURE PB4 is explained. At STEP SB5, a count value of loop counter 21 is compared with the specified loop count by means of loop comparator 22. If the former value is found to be below the latter value, then the program returns to STEP SB1. If the former value exceeds the latter value, then the program proceeds to STEP SB6.

At STEP SB6, instruction address comparator 12 makes a comparison between an instruction address stored in instruction address memory 11 and an instruction address on instruction address bus 3. If they disagree, then MPU 1 is judged not to be in the idle state. The program then proceeds to STEP SB10. At STEP SB10, clock generator 5 is controlled in such a way as to generate a normal frequency clock to MPU 1 and the program returns to STEP S1 of FIG. 2. On the other hand, if they agree, then MPU 1 is judged to be in the idle state. The program proceeds to STEP SB7. At STEP SB7, clock generator 5 is controlled in such a way as to generate a lower frequency clock as compared with the normal frequency clock to MPU 1. Next, at STEP SB8, loop counter 21 is reset to zero. At STEP SB9, clock counter 13 is reset to zero. The program then returns to STEP SB1.

In accordance with the third operation example, unlike the first and second operation examples, instruction address compare is not carried out for every loop, but only when the specified loop count is exceeded. In other words, instruction address comparator 12 need not operate during PROCEDURE PB3, which contributes to reducing the power consumption.

In accordance with the present embodiment, an address is sampled and the frequency of clocks is reduced when a loop according to the sampled address is detected to have been executed more than a predetermined number of times. This can provide a down-sized idle state detector capable of supplying only indication of a higher high linear increase with respect to an increase in the number of address bits, and the possibility that execution of a non-loop program is wrongly recognized as a loop can be held extremely low.

Embodiment 2

The first embodiment of this invention is not able to completely prevent a non-loop program from being recognized wrongly as a loop. To cope with such a problem, an idle state detector of the second embodiment includes a learning (memory) function of preventing the occurrence of false detection of the idle state.

Figure 6:
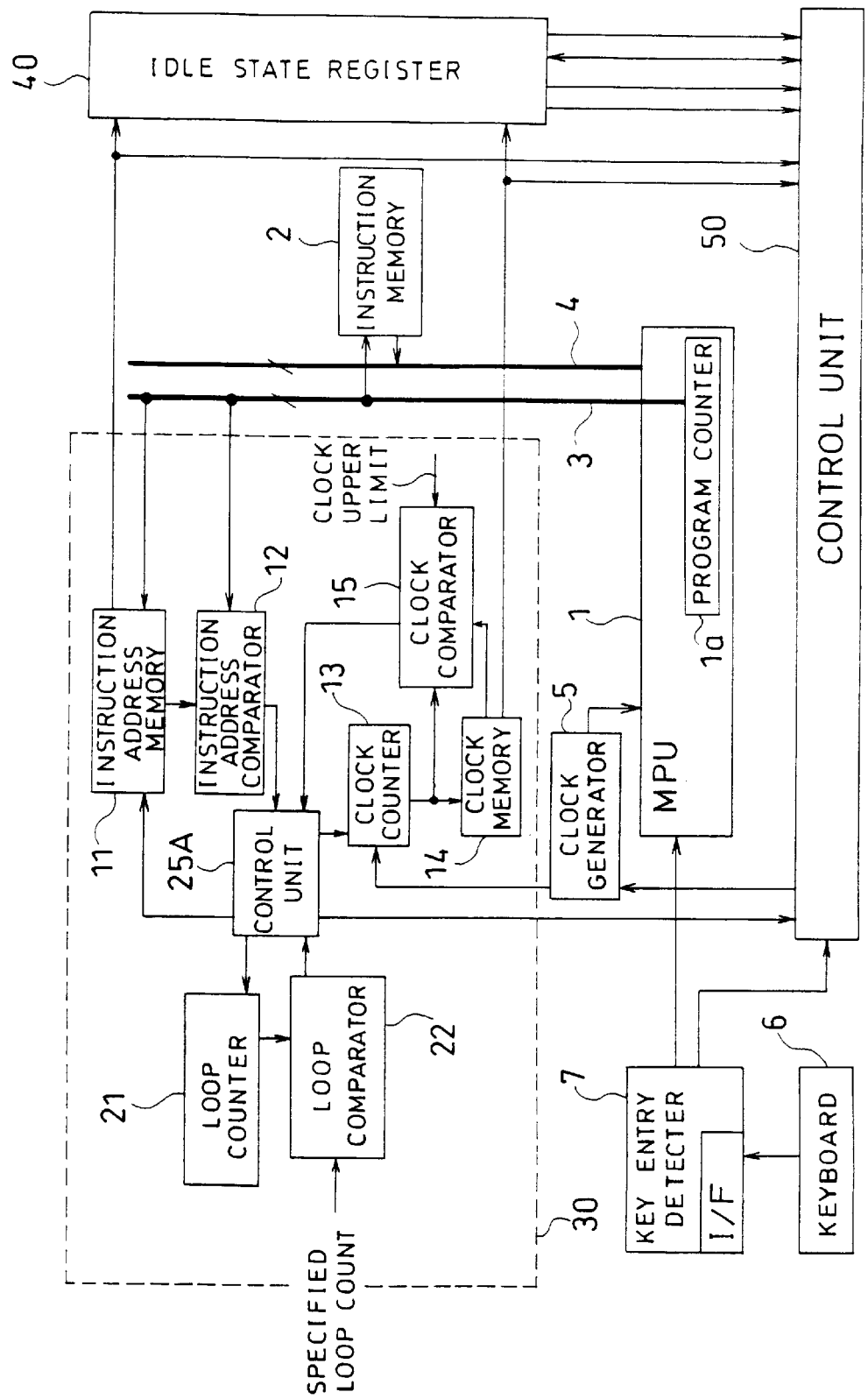
FIG. 6 is a block diagram of a second idle state detector in accordance with the present invention.

FIG. 6 shows in block form an idle state detector of the second embodiment. 1 is a microprocessor unit (MPU). 2 is an instruction memory. 3 is an instruction address bus. 4 is an instruction bus. 5 is a clock generator. These components are functionally the same as their counterparts in the first embodiment. Apart from them, 6 is a keyboard. 7 is a key-entry detecting unit (KDU). When there is made a key entry through keyboard 6, KDU 7 is operable to provide the contents of the key entry to MPU 1.

In the present embodiment, an idle state, i.e., a state in which MPU 1 is kept waiting for a key entry, is detected. This idle state terminates when a key entry is made from keyboard 6, and MPU 1 begins executing an instruction to accept the key entry.

The present idle state detector is composed of loop-execution-state detecting unit (LDU) 30, idle state register (ISR) 40, and control unit (CTRL) 50. LDU 30 is composed of Instruction address memory 11, instruction address comparator 12, clock counter 13, clock memory 14, clock comparator 15, loop counter 21, loop comparator 22, and internal control unit 25A wherein all of these components except for internal control unit 25A are functionally the same as their counterparts of FIG. 1 and are indicated by the same reference numerals.

LDU 30 is capable of detecting the existence of a loop execution state in which MPU 1 repeatedly executes a sequence of instructions, by watching instruction address bus 3. On detecting a loop execution state, LDU 30 applies a loop detection signal to CTRL 50, thereafter producing, as output to ISR 40, information descriptive of the loop execution state detected (hereinafter called the loop specifying information). In the present embodiment, the loop specifying information is composed of an address stored in instruction address memory 11 and a clock count value stored in clock memory 14. More specifically, the loop specifying information is composed of an address at which an instruction that is repeatedly executed in the loop execution state is stored and a clock count indicative of a time interval at which a loop address is repeatedly referred to.

ISR 40 receives from LDU 30 pieces of loop specifying information but stores, under the control of CTRL 50, only loop specifying information indicative of a loop execution state in which MPU 1 is placed in the idle state.

When LDU 30 sends out a loop detection signal, CTRL 50 makes a judgement of whether a detected loop execution state is an MPU idle state on the basis of ISR's 40 information.

A key entry on keyboard 6 causes KDU 7 to send out a supervisor signal to CTRL 50. If KDU 7 sends out a supervisor signal when a loop execution state terminates, this causes CTRL 50 to control ISR 40 to store an address and a clock count value received from LDU 30 as the idle state specifying information.

Figure 7:
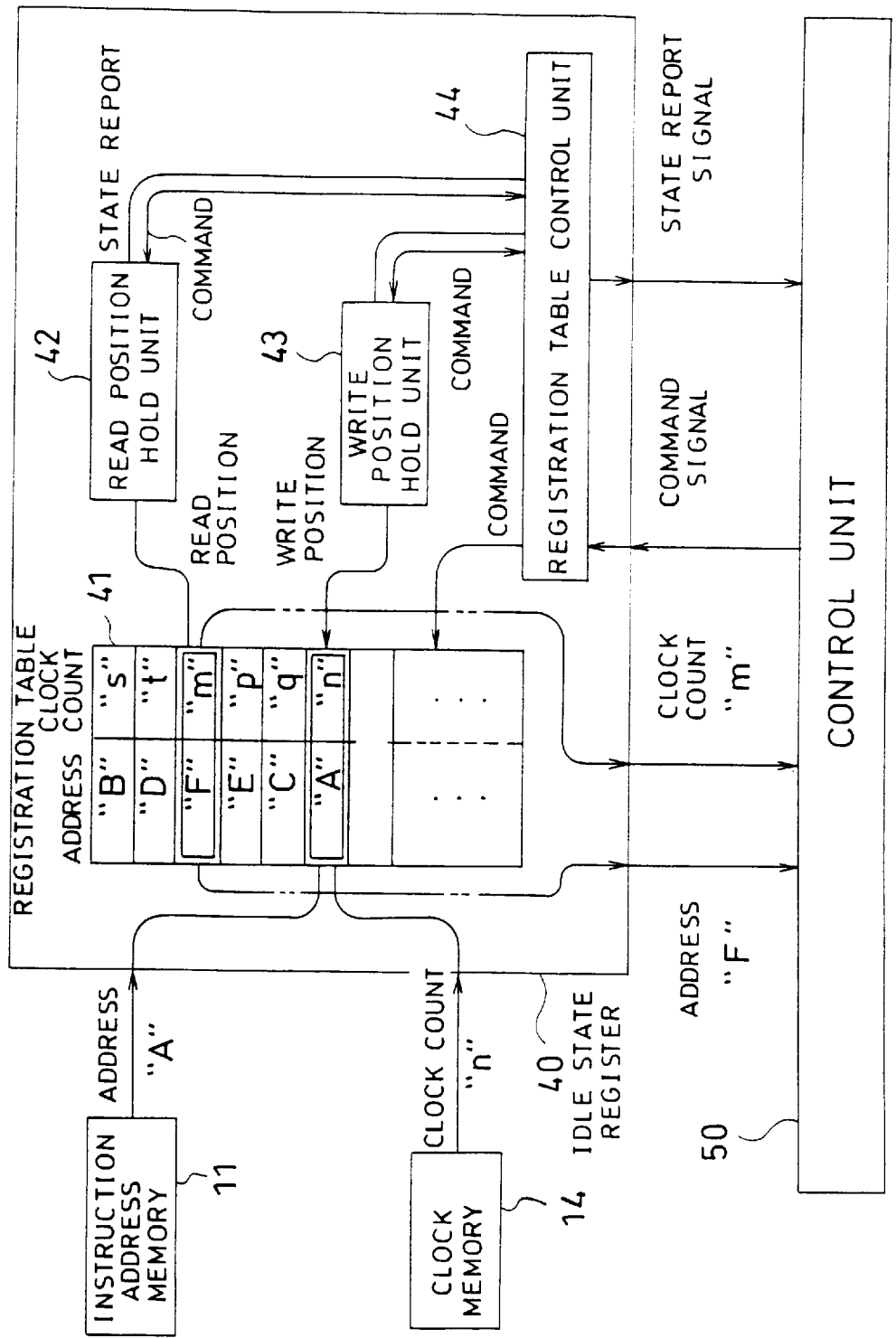
FIG. 7 is a block diagram illustrating the internal organization of an idle state register of the second idle state detector.

FIG. 7 illustrates in block form the internal organization of ISR 40. 41 is a registration table capable of storing pieces of idle state specifying information each of which is formed of an address and a clock count value. 42 is a read position hold unit capable of holding a read position in reading information out of registration table 41. 43 is a write position hold unit capable of holding a write position in writing information in registration table 41. 44 is a registration table control unit capable of controlling the reading and writing of registration table 41 and capable of controlling read position hold unit 42 and write position hold unit 43.

Figure 8:
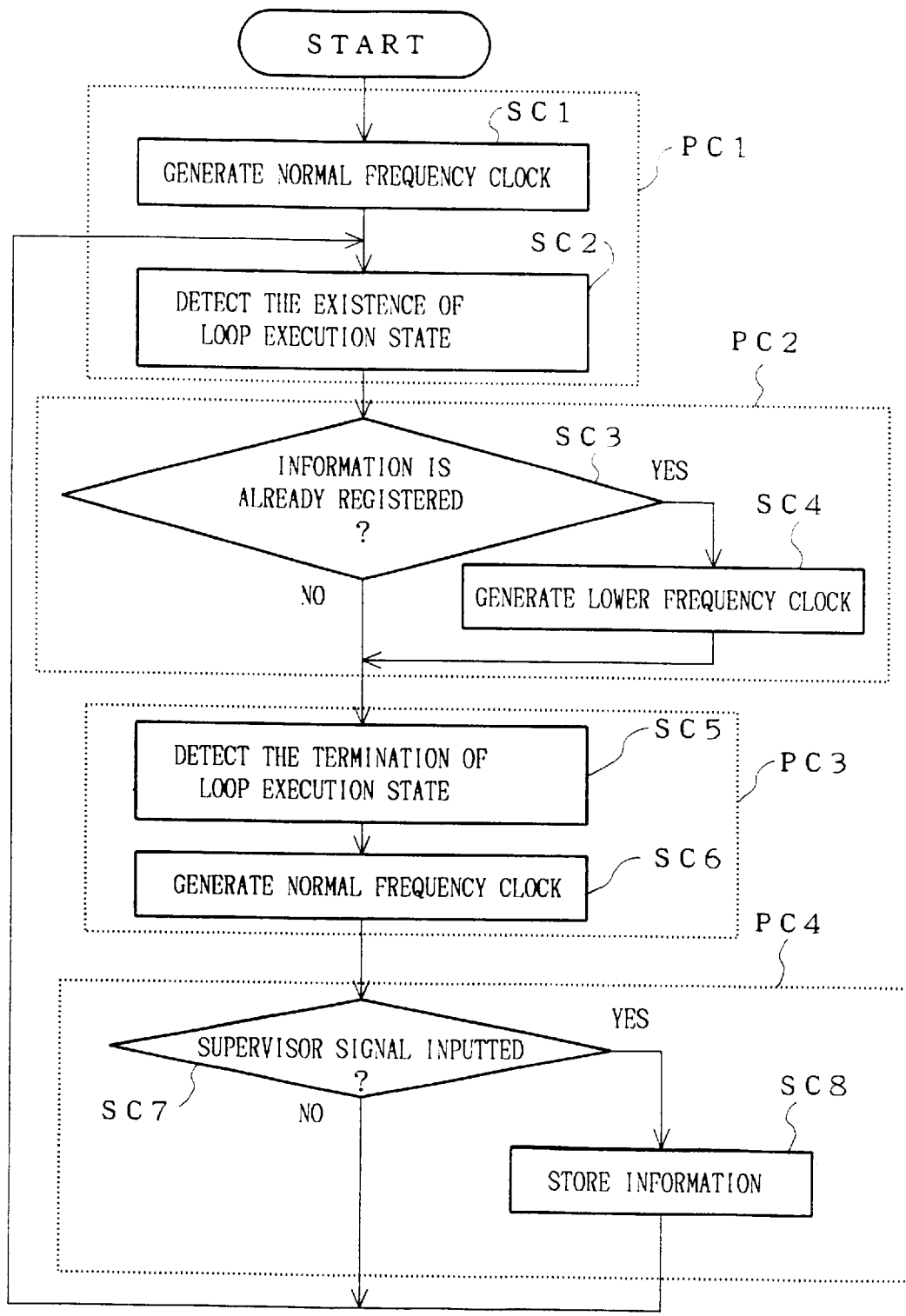
FIG. 8 is a diagram illustrating a sequence of operations of the second idle state detector.

FIG. 8 is a flow diagram illustrating a sequence of operations of CTRL 50. The operation of CTRL 50 is explained. A first procedure, i.e., PROCEDURE PC1, is a procedure to wait for a loop execution state to be detected by means of LDU 30. A second procedure, PROCEDURE PC2, is a procedure to make a judgement as to whether the detected loop execution state is one in which MPU 1 is placed in the idle state. A third procedure, PROCEDURE PC3, is a procedure to wait until the detected loop execution state terminates. A fourth procedure, PROCEDURE PC4 is a procedure to make a judgement as to whether the terminated loop execution state is one in which MPU 1 is placed in the idle state. In other words, PROCEDURE PC4 is a idle state learning procedure.

PROCEDURE PC1, comprised of STEPS SC1–SC2, is first described. At STEP SC1, clock generator 5 is controlled in such a way as to supply to MPU 1 a normal frequency clock for use in the regular operation. STEP SC2 is a step to wait for LDU 30 to detect a loop execution state.

PROCEDURE PC2, comprised of STEPS SC3–SC4, is described. If a loop execution state is detected at STEP SC2, then a judgement is made at STEP SC3 to determine whether ISR 40 has already received from LDU 30 and stored corresponding loop specifying information capable of specifying such a detected loop execution state. If STEP SC3 says YES, then the program proceeds to STEP SC4. At STEP SC4, clock generator 5 is controlled in such a way as to generate to MPU 1 a lower frequency clock as compared with the normal frequency clock. If STEP SC3 says NO, then the program proceeds to PROCEDURE PC3 comprised of STEPS SC5–SC6.

PROCEDURE PC3 is described. At STEP SC5, the program waits for LDU 30 to detect the termination of the loop execution state and waits for LDU 30 to stop sending out a loop detection signal. At STEP SC6, clock generator 5 is controlled in such a way to generate a normal frequency clock to MPU 1.

PROCEDURE PC4, comprised of STEPS SC7–SC8, is described. At STEP SC7, the program checks for the presence or absence of a key entry when LDU 30 detects the termination of the loop execution state from a key entry detection signal received from KDU 7. If a key entry detection signal is received, then the program proceeds to STEP SC8. At STEP SC8, ISR 40 stores loop specifying information received from LDU 30. Then, the program returns to STEP SC2. On the other hand, if no key entry detection signals are received, then the program returns to STEP SC2.

The actual operation of the present idle state detector is described below. At the time when MPU 1 is about to start operating, no idle state specifying information is stored in ISR 40. Therefore, even when a loop execution state of the MPU idle state is detected in PROCEDURE PC1, such a detected loop execution state is not judged so. As a result, the clock frequency remains unchanged, in other words it is not lowered.

If the termination of the loop execution state is detected in PROCEDURE PC3, then a check for the presence or absence of a key entry is made in PROCEDURE PC4. Where a detected loop execution state is a loop execution state of the MPU idle state, a key entry is always detected when the loop execution state terminates. Therefore, whenever a key entry is detected, loop specifying information as to a detected loop execution state is entered in ISR 40 as the MPU idle state information. On the other hand, if a key entry is not detected, then the detected loop execution state is judged not to be a loop execution state of the MPU idle state (e.g., a numerical operation loop in the matrix operation). In such a case, no loop specifying information is stored in ISR 40.

Hereinafter, if a loop execution state is detected in PROCEDURE PC1, then the detected loop execution state is checked if it is stored in ISR 40 as an MPU idle state. If stored, then clock generator 5 is controlled in such a way as to generate a lower frequency clock as compared with the normal frequency clock to MPU 1. As a result, MPU 1 makes a transit to a low power consumption state.

If a loop execution state that has not been entered yet in ISR 40 is detected and, in addition, if a key entry is detected upon termination of the detected loop execution state, then the detected loop execution state is stored in ISR 40 as an MPU idle state in PROCEDURE PC4. Such arrangement permits the clock frequency to be lowered when a loop execution state of the same type is detected the next time.

In accordance with the present embodiment, where no key entries are detected at the time when a loop execution state terminates as in the numerical operation processing, no loop specifying information is entered in ISR 40. Therefore, false detection of the MPU idle state can be avoided thereby to control clock generator 5 to generate a lower frequency clock to MPU 1 only when an MPU idle state is detected.

While in the present embodiment an address and a clock count are used acting as the loop specifying information, there is no guarantee that a loop execution state is specified by choosing a single address at random because a plurality of instructions are executed in a loop execution state. Therefore, selection of addresses that is capable of uniquely specifying a loop execution state is preferable. More specifically, it is considered that the maximum or minimum of all addresses that are referred to in a loop execution state be selected. In such a case, instruction address comparator 12 preferably has a function of making a comparison in magnitude between instruction addresses, and PROCEDURE P2 of FIG. 2 is to be modified as follows.

Before executing STEP S7, a comparison is made in magnitude between an instruction address on instruction address bus 3 and an instruction address stored in instruction address memory 11. If the former instruction address is found to be smaller than the latter one, then the former one is stored in instruction address memory 11. Clock counter 13 is reset to zero and the program returns to STEP S4. On the other hand, if the former instruction address is found not to be smaller than the latter one, then the program proceeds to STEP S7.

As a result of such a modification, the contents of instruction address memory 11 becomes the minimum of addresses to be referred to. Likewise, the contents of instruction address memory 11 may become the maximum of addresses to be referred to.

In the present embodiment, a case where a key entry terminates an MPU idle state is described. However, an idle state detector, which is capable of detecting an MPU idle state that is terminated by a mouse operation, or by an information input from a network, or by input/output operations of input/output ports, or by an interruption request, or by combinations thereof, can be provided using a supervisor signal.

In the present embodiment, it is designed such that ISR 40 is able to store MPU idle states of different types. However, ISR 40 may be organized such that it stores only one MPU idle state. In such a case, only a most recently detected MPU idle state is stored, in other words, a previously detected MPU idle state is replaced with a subsequently detected MPU idle state. Additionally, as a storage for storing an idle state, either one of instruction address memory 11 and clock memory 14 of LDU 30 may be available.

In the present embodiment, an idle state detector of the same type as shown in the first embodiment is used as LDU 30. However, other idle state detectors of different types may be used.

Each of the first and second embodiments brings reductions in the power consumption by reducing the clock frequency at the time when an MPU idle state is detected. However, the power consumption may be reduced employing other methods such as stopping the supply of clocks.

In each of the first and second embodiments, the number of instruction addresses to be stored in instruction address memory 11 and to be compared by instruction comparator 12 with an instruction address on instruction address bus 3 is one. However, a series of instruction addresses may be stored for comparison. Because of such arrangement, the possibility that a non-loop program execution is wrongly recognized as a loop can be reduced.

The invention claimed is:

1. An idle state detector for detecting the existence of an idle state in which a microprocessor unit repeatedly executes a sequence of instructions while at the same time waiting for an external command to be inputted, said idle state detector comprising:

first means for receiving an instruction address that is referred to by said microprocessor unit and a clock for the operation of said microprocessor unit, and for determining whether said microprocessor unit repeatedly makes a reference to a particular instruction address at time intervals of a fixed number of clocks;

second means for counting a number of times said microprocessor unit refers to said particular instruction address, and for determining whether said microprocessor unit makes said reference more than a predetermined number of times; and a control unit for, when said microprocessor is judged by said first means to repeatedly make said reference, having said second means count a number of times said microprocessor makes said reference, and for making a decision that said microprocessor unit is placed in an idle state when said microprocessor unit is judged by said second means to repeatedly make said reference more than said predetermined number of times.

2. The idle state detector of claim 1, said control unit being operable to control said clock for the operation of said microprocessor unit to have a lower frequency when said microprocessor unit is judged to be placed in an idle state.

3. The idle state detector of claim 1, said first means including:
   an instruction address memory for storing an instruction address that is referred to by said microprocessor unit, under the control of said control unit;
   an instruction address comparator for making a comparison between an instruction address that is stored in said instruction address memory and an instruction address that is referred to by said microprocessor unit so as to determine if they agree, and for providing a compare result to said control unit;
   a clock counter for counting a number of times said clock for the operation of said microprocessor unit is supplied, under the control of said control unit;
   a clock memory for storing a result of said counting operation performed by said clock counter; and
   a clock comparator for making a comparison between a result stored in said clock memory and a result of said counting operation performed by said clock counter, and for providing a compare result to said control unit.

4. The idle state detector of claim 3, said clock comparator further including a function of making a comparison between a result of said counting operation performed by said clock counter and a predetermined upper limit.

5. The idle state detector of claim 1, said second means including:
   a loop counter for counting a number of times said microprocessor unit makes said reference, under the control of said control unit; and
   a loop comparator for making a comparison between a result of said counting operation performed by said loop counter and a predetermined number of times, and for providing a compare result to said control unit.

6. An idle state detector for detecting the existence of an idle state in which a microprocessor unit repeatedly executes a sequence of instructions while at the same time waiting for an external command to be inputted, said idle state detector comprising:

(a) a loop execution state detecting unit for determining whether said microprocessor unit is placed in a loop execution state in which said microprocessor unit repeatedly executes a sequence of instructions, for sending out a loop detection signal and providing information descriptive of said loop execution state when said microprocessor unit is judged to be in a loop execution state:

(b) an idle state register for storing, from among information descriptive of loop execution states provided from said loop execution state detecting unit, only information descriptive of an idle state; and (c) a control unit (i) for determining whether information descriptive of a loop execution state provided from said loop execution state detecting unit and information descriptive of an idle state stored in said idle state register agree, (ii) for making a decision that said microprocessor unit is placed in an idle state when said loop execution state describing information and said idle state describing information agree, (iii) for determining whether a supervisor signal indicating the input of an external command which terminates an idle state is inputted, at the time when said loop execution state detecting unit stops sending out a loop detection signal, and (iv) for controlling said idle state register to store said loop execution state describing information as information descriptive of an idle state, when the presence of supervisor signal is detected.

7. The idle state detector of claim 6, said control unit being operable to control clock for the operation of said microprocessor unit to have a lower frequency when said microprocessor unit is judged to be placed in an idle state.

8. The idle state detector of claim 6, said information descriptive of a loop execution state being composed of an instruction address that is repeatedly referred to by said microprocessor unit and a clock count indicative of a number of clocks that are inputted within a period of time between when said microprocessor unit makes a reference to said instruction address and when said microprocessor unit makes a reference to said instruction address next time.

9. The idle state detector of claim 8, said loop execution state detecting unit including:
   first means for receiving an instruction address that is referred to by said microprocessor unit and a clock for the operation of said microprocessor unit, and for determining whether said microprocessor unit repeatedly makes a reference to a particular instruction address at time intervals of a fixed number of clocks;
   second means for counting a number of times said microprocessor unit makes said reference, and for determining whether a result of said counting operation exceeds a predetermined number of times; and
   an internal control unit for, when said microprocessor is judged by said first means to repeatedly make said reference, having said second means count a number of times said microprocessor makes said reference, and for making a decision that said microprocessor unit is placed in an idle state when said microprocessor unit is judged by said second means to repeatedly make said reference more than said predetermined number of times.

10. The idle state detector of claim 9, said first means including:
   an instruction address memory for storing an instruction address that is referred to by said microprocessor unit, under the control of said internal control unit;
   an instruction address comparator for making a comparison between an instruction address that is stored in said instruction address memory and an instruction address that is referred to by said microprocessor unit so as to determine if they agree, and for providing a compare result to said internal control unit;

a clock counter for counting a number of times said clock for the operation of said microprocessor unit is supplied, under the control of said internal control unit;

a clock memory for storing a result of said counting operation performed by said clock counter; and a clock comparator for making a comparison between a result stored in said clock memory and a result of said counting operation performed by said clock counter, and for providing a compare result to said internal control unit.

11. The idle state detector of claim 10, said instruction address comparator further including a function of making a comparison in magnitude between an instruction address that is stored in said instruction address memory and an instruction address that is referred to by said microprocessor unit.

12. The idle state detector of claim 10, said clock comparator further including a function of making a comparison between a result of said counting operation performed by said clock counter and a predetermined upper limit.

13. The idle state detector of claim 9, said second means including:
  a loop counter for counting a number of times said microprocessor unit makes said reference, under the control of said microprocessor unit; and
  a loop comparator for making a comparison between a result of said counting operation performed by said loop counter and a predetermined number of times, and for providing a compare result to said internal control unit.

14. A method for detecting the existence of an idle state in which a microprocessor unit repeatedly executes a sequence of instructions while at the same time waiting for an external command to be inputted, said idle state detector comprising:

a first step of storing an instruction address that is referred to by said microprocessor unit;

a second step of counting a number of times a clock is supplied to said microprocessor unit within a period between when said microprocessor unit makes a reference to said instruction address and when said microprocessor unit makes a reference to said instruction next time, and of storing a result of said counting operation as a clock count value;

a third step of counting a number of times said microprocessor unit refers to said instruction address at time intervals of said stored clock count value, for comparison with a predetermined number of times; and a fourth step of making a decision that said microprocessor unit is placed is an idle state, when a result of said counting operation of said third step exceeds said predetermined number of times.

15. The method of claim 14, (i) said first step including:
  storing an instruction address that is referred to by said microprocessor unit; and
  resetting both a clock count value and a loop count value to zero;

(ii) said second step including:
  increasing said clock count value by one each time said microprocessor unit inputs a clock;
  making a comparison between an instruction address that is currently referred to by said microprocessor unit and said stored instruction address; and
  storing said clock count value as a first value and resetting same to zero, when said currently referred-to instruction address and said stored instruction address agree and when said clock count value is below a predetermined value;

(iii) said third step including:
  increasing said clock count value by one each time said microprocessor unit inputs a clock;
  making a comparison between an instruction address that is currently referred to by said microprocessor unit and said stored instruction address; and
  increasing said loop count value by one, when said currently referred-to instruction address and said stored instruction address agree and when said clock count value and said first value agree; and (iv) said fourth step including:
  making a decision that said microprocessor unit is placed in an idle state, when said loop count value exceeds a predetermined value.

16. The method of claim 14, (i) said first step including:
  storing an instruction address that is referred to by said microprocessor unit; and
  resetting both a clock count value and a loop count value to zero;

(ii) said second step including:
  increasing said clock count value by one each time said microprocessor unit inputs a clock;
  making a comparison between an instruction address that is currently referred to by said microprocessor unit and said stored instruction address; and
  storing said clock count value as a first value and resetting same to zero, when said currently referred-to instruction address and said stored instruction address agree and when said clock count value is below a predetermined value;

(iii) said third step including:
  increasing said clock count value by one each time said microprocessor unit inputs a clock;
  making a comparison between said clock count value and said first value;
  making a comparison between an instruction address that is currently referred to by said microprocessor unit and said stored instruction address, when said clock count value and said first value agree; and
  increasing said loop count value by one when said currently referred-to instruction address and said stored address agree; and (iv) said fourth step including:
  making a decision that said microprocessor unit is placed in an idle state, when said loop count value exceeds a predetermined value.

17. A method for detecting the existence of an idle state in which a microprocessor unit repeatedly executes a sequence of instructions while at the same time waiting for an external command to be inputted, said method comprising:

(i) a first step including:
  storing an instruction address that is referred to by said microprocessor unit; and resetting both a clock count value and a loop count value to zero;
(ii) a second step including:
increasing said clock count value by one each time said microprocessor unit inputs a clock;
making a comparison between an instruction address that is currently referred to by said microprocessor unit and said stored instruction address; and
storing said clock count value as a first value and resetting same to zero, when said currently referred-to instruction address and said stored instruction address agree and when said clock count value is below a predetermined value;
(iii) a third step including:
increasing said clock count value by one each time said microprocessor unit inputs a clock;
making a comparison between said clock count value and said first value;
increasing said loop count value by one when said clock count value and said first value agree; and
(iv) a fourth step including:
making a comparison between an instruction address that is currently referred to by said processor and said stored instruction address, when said loop count value exceeds a predetermined value; and
making a decision that said microprocessor unit is placed in an idle state when said currently referred-to instruction address and said stored instruction address agree.

18. A method for detecting the existence of an idle state in which a microprocessor unit repeatedly executes a sequence instructions while at the same time waiting for an external command to be inputted, said idle state detecting method comprising:
(1) a pre-step of providing in idle state register for storing information for specifying an idle state;
(ii) a first step including:
determining whether said microprocessor unit is placed in a loop execution state in which aid microprocessor unit repeatedly executes a sequence of instructions;
(iii) a second step including:
when said microprocessor unit is judged to be in a loop execution state at said first step, determining information descriptive of said loop execution state; and
making a decision that said microprocessor unit is placed in an idle state, when information descriptive of an idle state stored in said idle state register and said determined information agree;
(iv) a third step including:
determining whether said microprocessor unit leaves said loop execution state; and
(v) a fourth step including:
determining whether a supervisor signal indicating the input of an external command which terminates an idle state is generated, when said microprocessor unit is judged to leave said loop execution state; and
having said state register store said loop execution state describing information as information descriptive of an idle state, when a supervisor signal is detected to be generated.

19. The method of claim 18,
said loop execution state describing information being composed of an instruction address that is repeatedly referred to by said microprocessor unit and a clock count indicative of a number of clocks that are inputted within a period of time between when said microprocessor unit makes a reference to said instruction address and when said microprocessor unit makes a reference to said instruction address next time.

20. The method of claim 18,
said first step comprising:
(i) a first process including:
storing an instruction address that is referred to by said microprocessor unit; and
resetting both a clock count value and a loop count value to zero;
(ii) a second process including:
increasing said clock count value by one each time said microprocessor unit inputs a clock;
making a comparison between an instruction address that is currently referred to by said microprocessor unit and said stored instruction address; and
storing said clock count value as a first value and resetting same to zero, when said currently referred-to instruction address and said stored instruction address agree and when said clock count value is below a predetermined value;
(iii) a third process including:
increasing said clock count value by one each time said microprocessor unit inputs a clock;
making a comparison between an instruction address that is currently referred to by said microprocessor unit and said stored instruction address; and
increasing said loop count value by one, when said currently referred-to instruction address and said stored instruction address agree and when said clock count value and said first value agree; and
(iv) a fourth process including:
making a decision that said microprocessor unit is placed in a loop execution, when said loop count value exceeds a predetermined value.

21. The method of claim 20,
said second process further including:
a process of storing, when said currently referred-to instruction address is greater in value than said stored instruction address, the former instruction address, and of returning to said first process.

22. The method of claim 20,
said second process further including:
a process of storing, when said currently referred-to instruction address is lower in value than said stored instruction address, the former instruction address, and of returning to said first process.

23. The method of claim 18,
said first step comprising:
(i) a first process including:
storing an instruction address that is referred to by said microprocessor unit; and
resetting both a clock count value and a loop count value to zero;
(ii) a second process including:
increasing said clock count value by one each time said microprocessor unit inputs a clock;
making a comparison between an instruction address that is currently referred to by said microprocessor unit and said stored instruction address; and
storing said clock count value as a first value and resetting same to zero, when said currently referred-to instruction address and said stored instruction address agree and when said clock count value is below a predetermined value;
(iii) a third process including:
increasing said clock count value by one each time said microprocessor unit inputs a clock;

making a comparison between said clock count value and said first value;
making a comparison between an instruction address that is currently referred to by said microprocessor unit and said stored instruction address, when said clock count value and said first value agree; and
increasing said loop count value by one when said currently referred-to instruction address and said stored instruction address agree; and
(iv) a fourth process including:
making a decision that said microprocessor unit is placed in a loop execution state, when said loop count value exceeds a predetermined value.

24. The method of claim 23,
said second process further including:
a process of storing, when said currently referred-to instruction address is greater in value than said stored instruction address, the former instruction address, and of returning to said first process.

25. The method of claim 23,
said second process further including:
a process of storing, when said currently referred-to instruction address is lower in value than said stored instruction address, the former instruction address, and of returning to said first process.

26. The method of claim 18,
said first step comprising:
(i) a first process including:
storing an instruction address that is referred to by said microprocessor unit; and
resetting both a clock count value and a loop count value to zero;
(ii) a second process including:
increasing said clock count value by one each time said microprocessor unit inputs a clock;
making a comparison between an instruction address that is currently referred to by said microprocessor unit and said stored instruction address; and
storing said clock count value as a first value and resetting same to zero, when said currently referred-to instruction address and said stored instruction address agree and when said clock count value is below a predetermined value;
(iii) a third process including:
increasing said clock count value by one each time said microprocessor unit inputs a clock;
making a comparison between said clock count value and said first value;
increasing said loop count value by one when said clock count value and said first value agree; and
(iv) a fourth process including:
making a comparison between an instruction address that is currently referred to by said processor and said stored instruction address, when said loop count value exceeds a predetermined value; and
making a decision that said microprocessor unit is placed in a loop execution state when said currently referred-to instruction address and said stored instruction address agree.

27. The method of claim 26,
said second process further including:
a process of storing, when said currently referred-to instruction address is greater in value than said stored instruction address, the former instruction address, and of returning to said first process.

28. The method of claim 26,
said second process further including:
a process of storing, when said currently referred-to instruction address is lower in value than said stored instruction address, the former instruction address, and of returning to said first process.

* * * * *